United States Patent
Park et al.

(10) Patent No.: US 7,233,594 B2
(45) Date of Patent: Jun. 19, 2007

(54) APPARATUS FOR TRANSMITTING/RECEIVING WIRELESS DATA AND METHOD THEREOF

(75) Inventors: Jeong-hoon Park, Suwon (KR); Dong-seek Park, Suwon (KR)

(73) Assignee: Samsung Electronics Co., Ltd., Kungki-do (KR)

( * ) Notice: Subject to any disclaimer, the term of this patent is extended or adjusted under 35 U.S.C. 154(b) by 731 days.

(21) Appl. No.: 09/783,134

(22) Filed: Feb. 15, 2001

(65) Prior Publication Data

US 2001/0050923 A1 Dec. 13, 2001

(30) Foreign Application Priority Data

Jun. 9, 2000 (KR) ................ 2000-31661

(51) Int. Cl.
- H04L 12/28 (2006.01)
- H04J 3/22 (2006.01)
- H04J 3/12 (2006.01)

(52) U.S. Cl. ............... 370/394; 370/470; 370/528

(58) Field of Classification Search ........... 370/310.1, 370/389, 392, 395.1, 395.52, 395.6, 469, 370/474, 433
See application file for complete search history.

(56) References Cited

U.S. PATENT DOCUMENTS

| | | | |
|---|---|---|---|
| 5,541,919 A * | 7/1996 | Yong et al. ............. | 370/416 |
| 5,570,362 A * | 10/1996 | Nishimura ............. | 370/466 |
| 5,602,837 A * | 2/1997 | Takahashi ............. | 370/280 |
| 5,603,081 A * | 2/1997 | Raith et al. ............. | 455/435.3 |
| 5,642,365 A * | 6/1997 | Murakami et al. ........ | 714/761 |
| 5,657,316 A * | 8/1997 | Nakagaki et al. ......... | 370/394 |
| 5,822,321 A | 10/1998 | Petersen et al. | |
| 5,896,575 A | 4/1999 | Higginbotham et al. | |
| 6,445,717 B1 * | 9/2002 | Gibson et al. ............. | 370/473 |
| 6,477,176 B1 * | 11/2002 | Hamalainen et al. ....... | 370/435 |
| 6,507,582 B1 * | 1/2003 | Abrol ..................... | 370/394 |

(Continued)

FOREIGN PATENT DOCUMENTS

CN 1221548 A 6/1999

(Continued)

OTHER PUBLICATIONS

DARPA Internet Program: "Transmission Control Protocol" RFC 793, Sep. 1981, XP002102119.

(Continued)

Primary Examiner—Wing Chan
Assistant Examiner—Warner Wong
(74) Attorney, Agent, or Firm—Sughrue Mion, PLLC

(57) ABSTRACT

A method for transmitting and/or receiving wireless data and an apparatus therefor are provided. The method includes the steps of (a) when the length of a collection of data in an application layer is longer than the length of the payload of a protocol which the lower layer supports, dividing the collection of data into a plurality of protocol units, and transmitting the protocol units of data after adding at least one of the length information and location information of the data divided into the protocol units; and (b) determining whether or not a loss of data occurred, by referring to the information on the length and location of data divided into the protocol units in the step (a), and inserting blank data into the part corresponding to the lost data to re-form the entire collection of data.

29 Claims, 4 Drawing Sheets

U.S. PATENT DOCUMENTS

| | | | |
|---|---|---|---|
| 6,507,590 B1 * | 1/2003 | Terho et al. | 370/466 |
| 6,556,556 B1 * | 4/2003 | Sen et al. | 370/342 |
| 6,574,223 B1 * | 6/2003 | Brueckheimer et al. | 370/395.6 |
| 6,728,208 B1 * | 4/2004 | Puuskari | 370/230.1 |
| 2001/0005367 A1 * | 6/2001 | Liu et al. | 370/389 |

FOREIGN PATENT DOCUMENTS

| | | |
|---|---|---|
| CN | 1247657 A | 3/2000 |
| EP | 0 975 123 A | 1/2000 |
| EP | 0975123 A1 | 1/2000 |
| JP | 5-103016 A | 4/1993 |
| JP | 6-54026 A | 2/1994 |
| JP | 7-303117 A | 11/1995 |
| JP | 7-321873 A | 12/1995 |
| JP | 9-51541 A | 2/1997 |
| JP | 10-257096 A | 9/1998 |

OTHER PUBLICATIONS

Armitage, G. J., et al.: "Packet Reassembly During Cell Loss. Network Transmission of Datagrams by the ATM Adaptation Layer Can Produce Lost Cells, Resulting in Incorrect or Aborted Datagram Reassembly" IEEE Network, IEEE Inc. New York, US, vol. 7, No. 5, Sep. 1, 1993, pp. 26-34, XP000615027.

* cited by examiner

APPARATUS FOR TRANSMITTING/RECEIVING WIRELESS DATA AND METHOD THEREOF

BACKGROUND OF THE INVENTION

1. Field of the Invention

The present invention relates to a wireless data transmitting and receiving apparatus and method, and more particularly, to a wireless data transmitting and receiving apparatus for processing divided protocol data, and a wireless data transmitting and receiving method thereof. The present application is based on Korean Patent Application No. 2000-31661 filed on Jun. 9, 2000, which is incorporated herein by reference.

2. Description of the Related Art

Generally a wireless transmitting apparatus and receiving apparatus pair use the layers shown in the block diagram of FIG. 1. The application layer 110 includes such codec-related standards as H.324M, H.324, and T.120. The physical layer performs channel-coding, pseudo-noise spreading, and modulation, and includes a part for air interface.

The radio link protocol (hereinafter referred to as "RLP") layer 120 includes a signaling unit (not shown), and converts a payload in the application layer 110 received through a wireless route, into the input format of the physical layer 140.

The RPL layer 120 includes a plurality of radio link protocol data sets (RLPs), each corresponding to one of n application data sets (here, n is a positive integer), and is connected to the physical layer 140 via a MUX sub-layer 130.

The MUX sub-layer 130 multiplexes an RLP data set received from the RLP layer 120 adaptively into a protocol data unit (PDU).

At this time, when the length of data in the application layer 110 is longer than the payload of a format which the RLP supports, the data in the application layer 110 is divided in the RLP layer 120 and transmitted as a plurality of RLP data sets. However, when the plurality of RLP data sets are received, the occurrence of any loss due to bit errors in the layers lower than the RLP layer 120 causes a situation in which the data in the application layer 110 cannot be restored to its original size.

SUMMARY OF THE INVENTION

To solve the above problems, it is an object of the present invention to provide a wireless data transmitting and receiving method for enhancing the reliability of data by adding information on the location and size of data, which are divided into each RLP data set when received from an application layer by an RLP layer, to a packet.

It is another object to provide a wireless data transmitting and receiving apparatus for enhancing the reliability of data by using this wireless data transmitting and receiving method.

To accomplish the above object of the present invention, there is provided a wireless data transmitting and/or receiving method having the steps of (a) when the length of a collection of data in an application layer is longer than the length of the payload of a protocol which the lower layer supports, dividing the collection of data into a plurality of protocol units, and transmitting the protocol units of data after adding at least one of the length information and location information of the data divided into the protocol units; and (b) determining whether or not a loss of data occurred, by referring to the information on the length and location of data divided into the protocol units in the step (a), and inserting blank data into the part corresponding to the lost data to re-form the entire collection of data.

To accomplish another object of the present invention, there is also provided a wireless data transmitting method having the steps of (a) when the length of a collection of data in a predetermined layer is longer than the length of the payload of a protocol which the lower layer supports, dividing the collection of data in the predetermined layer into a plurality of protocol units of data; and (b) transmitting the protocol units of data of the lower layer, after adding at least one of the length information and location information of the data divided into the protocol units.

To accomplish another object of the present invention, there is also provided a wireless data receiving method in which application data is divided into a plurality of predetermined protocol units, and a bit stream, in which at least one of the length information and location information of data divided into the protocol units is added, is received, the wireless data receiving method having the steps of (a) receiving the predetermined protocol units in a predetermined sequence, and checking whether or not data is lost by using information on the length and location of data added to each of the predetermined protocol units; and (b) when the result of checking in the step (a) indicates that data is lost from the protocol units, adding an amount of blank data equal to the amount of data lost into the part from which the data was lost, and then transmitting the data to the upper layer.

To accomplish another object of the present invention, there is also provided an apparatus for transmitting and/or receiving wireless data, having a transmitting means for dividing a collection of data in an application layer into a plurality of protocol units which a lower layer supports, adding at least one of the length information and location information of the data to the header of each unit and transmitting the protocol units; and a receiving means for determining whether or not data included in the protocol units is lost, by referring to the information on the length and location of the data added to the header of each OF the predetermined protocol units received from the transmitting means, and re-forming the collection of data by inserting blank data into any part from which data is lost.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
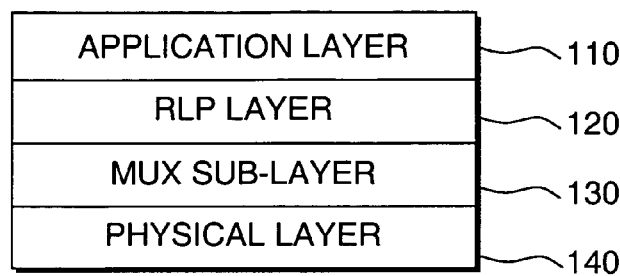
FIG. 1 illustrates layers for a general wireless transmitting apparatus and receiving apparatus pair.
Figure 2:
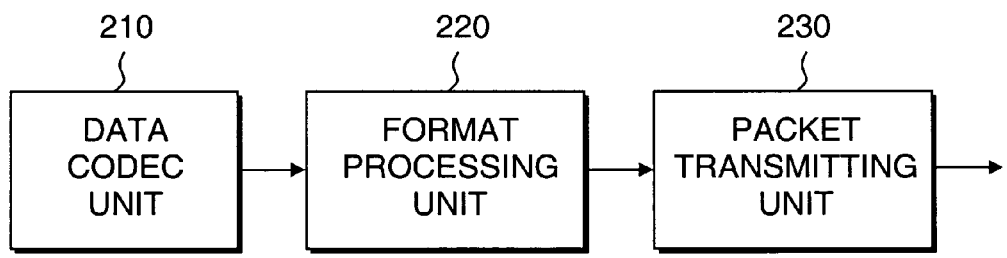
FIG. 2 is a block diagram showing a wireless data transmitting apparatus according to the present invention.

FIG. 2 is a block diagram showing a wireless data transmitting apparatus according to the present invention.

Referring to FIG. 2, a data codec unit 210 encodes application data, using an application program such as H.323 codec standard. An RLP format processing unit 220 compares the length of the encoded application data with the length of the payload of a format which the RLP layer supports. When the length of the encoded application data is longer than the length of the payload of the RLP format, the RLP format processing unit 220 divides the application data and loads the divided application data to each payload of a plurality of RLP protocols, and adds information on the length and location of divided data to the header of each protocol unit resulting from the division of the application data. A packet transmitting unit 230 transmits data, which is processed in the RLP format processing unit 220, in units of packets using a user datagram protocol (UDP) or transmission control protocol (TCP).

Figure 3:
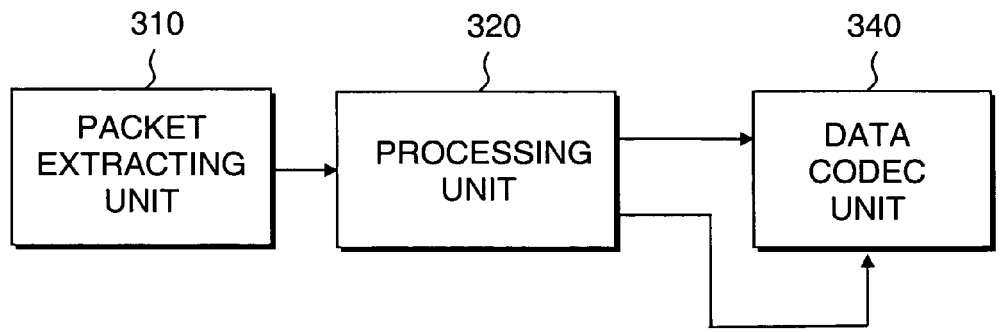
FIG. 3 is a block diagram showing a wireless data receiving apparatus according to the present invention.

FIG. 3 is a block diagram showing a wireless data receiving apparatus according to the present invention.

Referring to FIG. 3, a packet extracting unit 310 extracts the header information and payload of each protocol unit from data received according to the UDP or TCP, when the packet extracting unit 310 sends the received data to each layer. An RIP processing unit 320 determines whether or not data in the protocol units is lost by referring to information on the length and location of data in the RLP which is in header information extracted by the packet extracting unit 310. The RLP processing unit 320 re-forms the entire collection of application data by inserting blank data in the part where data was lost from the protocol units.

The RLP processing unit 320 signals whether or not blank data is inserted, to the upper layer. Referring to the signaling from the RLP processing unit 320, a data codec unit 340 decodes the received data.

Figure 4:
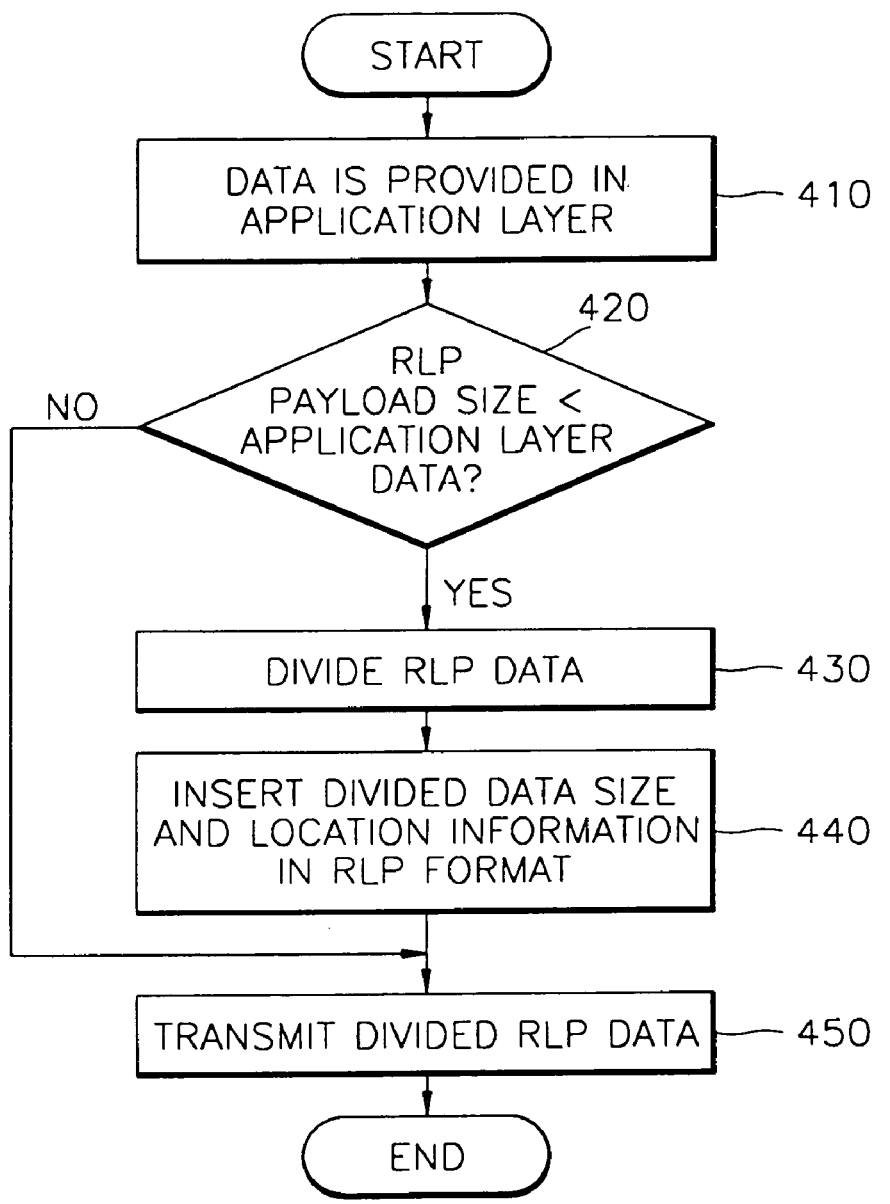
FIG. 4 is a flowchart showing a method for transmitting wireless data according to the present invention.

FIG. 4 is a flowchart showing a method for transmitting wireless data according to the present invention.

First, when data is transmitted and received using a wireless data communication system, data of the application layer is generally provided in the format defined in an RLP in step 410.

Then, whether or not the size of data in the application layer is smaller than the size of the payload defined in the RLP is checked in step 420.

Figure 5:
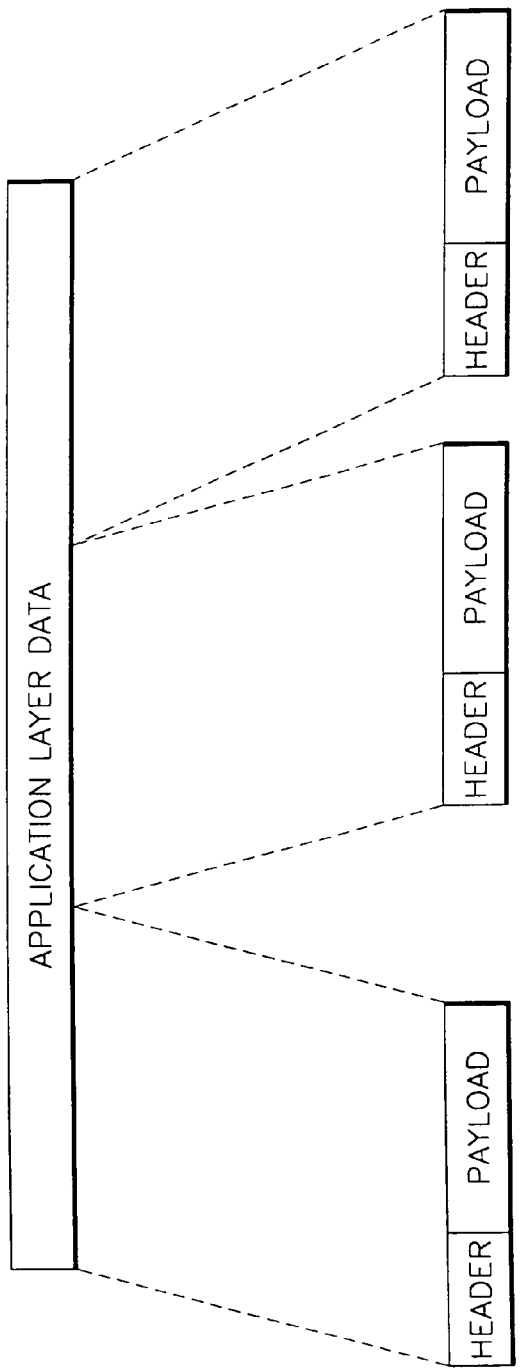
FIG. 5 illustrates a signal format for explaining the flowchart of FIG. 4.

When the size of the payload defined in the RLP is smaller than the size of data in the application layer, the data in the application layer is divided and each set of divided data is loaded on a payload of a plurality of RLPs as shown in FIG. 5, in step 430.

Then, information on the length and location of data in the RLP being divided is added to the header of each RLP data set in step 440.

Therefore, the application data is divided into a plurality of RLP frames as shown in FIG. 5, and information on the length and location of data sets is inserted into the header of each RLP, and the divided data sets are loaded on the payloads. For example, when 1000-bit application data uses an RLP in which a 100-bit payload can be transmitted, 10 RLPs are generated.

Then, the RLP data sets are transmitted in units of packets through the MUX sub-layer and physical layer in step 450.

Figure 6:
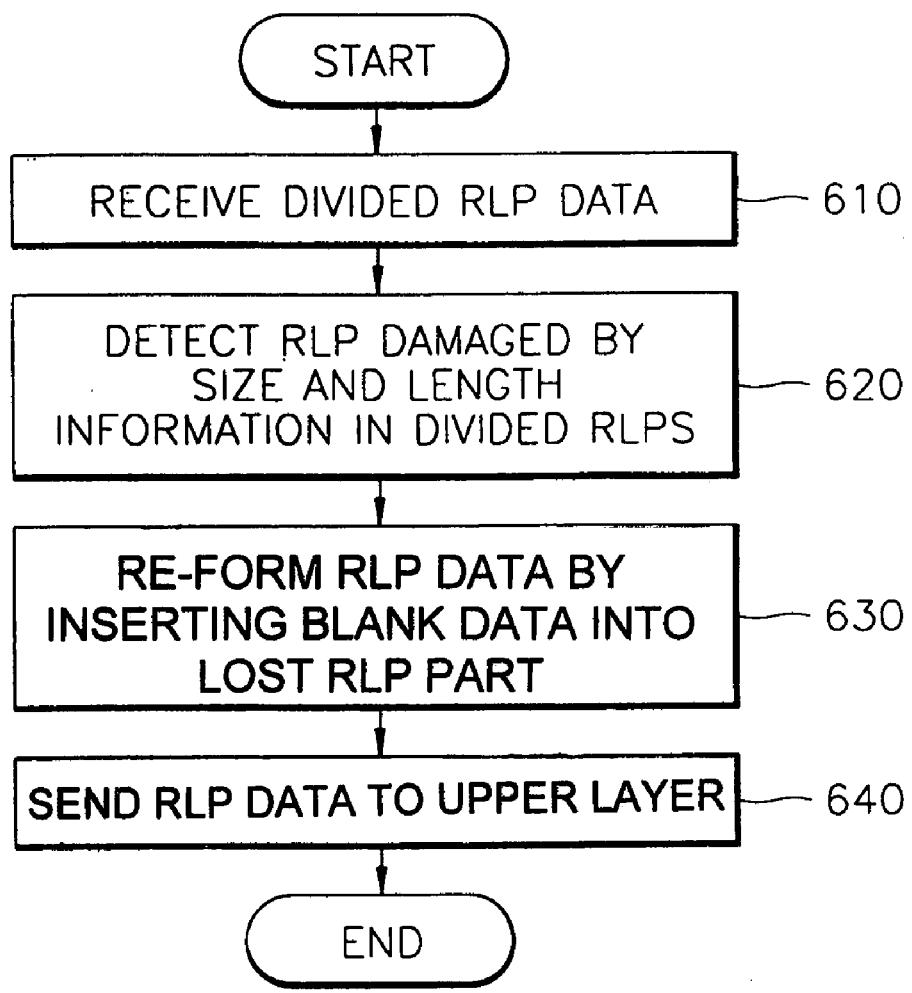
FIG. 6 is a flowchart showing a method for receiving wireless data according to the present invention.

FIG. 6 is a flowchart showing a method for receiving wireless data according to the present invention.

For example, it is assumed that 1000-bit application data is divided into 10 sets of RLP data, each of which is 100 bits long.

The divided RLP data is received by the RLP layer in units of packets through the MUX sub-layer and physical layer in step 610.

Next, the header and payload of the divided RLP data is extracted from the RLP layer, and by using information on the length and location of data added to each header, lost RLP data is detected in step 620. For example, when only the second data and fifth data sets are lost among 10 sets of RLP data, it means the first set data and third set data are received, and therefore, it is determined that the second data set starts from the location of the 101st bit; thus, the 101st-200th bit is lost. The fifth data starts from the location of the 401st bit; thus, the 401st-500th bit is lost.

Then, by inserting blank data of size equal to the size of the lost RLP data part, the RLP data is re-formed in step 630. For example, blank data corresponding to the lost data in the second and fifth data sets, that is, 101st-200th bits and 401st-500th bits, is inserted to form the entire 1000-bit data collection. Blank data can be generated, for example, by referring to information which is added to the header of a preceding or succeeding protocol unit.

Then, the re-formed RLP data is transmitted to the upper layer in step 640. At this time, a signaling sign which indicates whether or not blank data is inserted is transmitted together with the RLP data to the upper layer.

When the last divided RLP data set is lost, the length cannot be found. Therefore, a length of blank data equal to the length of the second-to-last RLP data set is inserted, and the data and information on the changed data length are transmitted to the upper layer.

When the first RLP data set is lost, a length of blank data equal to the length of the second RLP data set is inserted and then the RLP data is transmitted to the upper layer.

Figure 7:
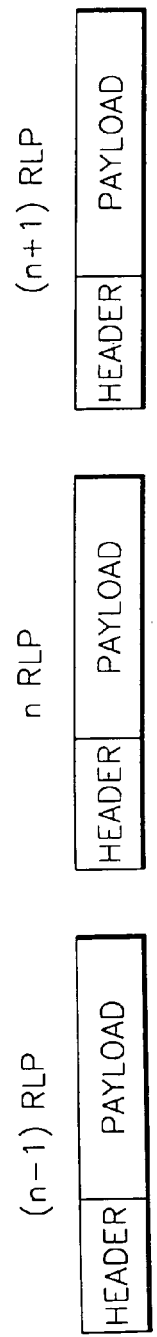
FIG. 7 is a conceptual diagram for generating blank data when a radio link protocol (RLP) frame is lost in the flowchart of FIG. 6.

FIG. 7 is a conceptual diagram for generating blank data when a radio link protocol (RLP) frame is lost in the flowchart of FIG. 6.

Referring to FIG. 7, when the n-th RLP frame is lost, the location of the n-th RLP is determined as a value obtained by (n−1)th RLP location+(n−1)th RLP length+1, and the length of the n-th RLP is determined as a value obtained by (n+1)th RLP location−1.

The present invention is not restricted to the above-described embodiments, and many variations are possible within the spirit and scope of the present invention. For example, in another embodiment, whether or not to transmit RLP data to the upper layer when one or more RLPs are lost can be determined according to the characteristic of the application layer. That is, when the first RLP data set is most important among the RLP data generated in the application layer, no RLP data sets are transmitted to the upper layer. However, when data is processed regardless of the upper layer, blank data is inserted into the part in which RLP data is lost, and then the RLP data is transmitted in general. At this time, the upper layer can process the received data using its own method.

The present invention may be embodied in program code, which can be read by a computer, on a computer readable recording medium. The computer readable recording medium includes any medium on which computer readable data can be stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute computer readable code in a distributed mode.

As described above, according to the present invention, since information on the location and length of divided data is added to the divided RLP data set at the transmitting side, a lost part can be filled using the information on the location and length of divided data and then transmitted to the upper layer.

What is claimed is:

1. A wireless data transmitting or receiving method comprising:
   (a) when a length of a collection of data in an application layer is longer than a length of a payload of a protocol, dividing the collection of data into a plurality of protocol units, and transmitting the protocol units of data after adding length information and location information of the data divided into the protocol units; and
   (b) determining whether or not a loss of data has occurred, by referring to the length and location information of data divided into the protocol units in (a), and if it determined that the loss of data from the protocol units has occurred, inserting blank data into a part corresponding to lost data to re-form the entire collection of data, transmitting to an upper layer the re-formed data and signaling to the upper layer an indication of whether or not the blank data is inserted, wherein
   said blank data is generated by referring to the length and location information of data, which is added to a header of a preceding or succeeding protocol unit.

2. The wireless data transmitting or receiving method of claim 1, wherein in (a), the protocol is supported by a lower layer.

3. A wireless data receiving method wherein application data is divided into a plurality of predetermined protocol units, and a bit stream, in which length information and location information of data divided into the protocol units is added, is received, the wireless data receiving method comprising:
   (a) receiving the predetermined protocol units in a predetermined sequence, and checking whether or not data is lost, by referring to the length and location information of data added to each of the predetermined protocol units; and
   (b) when the result of checking (a) indicates that data is lost from the protocol units, re-forming the collection of data by adding an amount of blank data equal to an amount of data lost, into a part from which the data was lost, and then transmitting the re-formed data to an upper layer and signaling to the upper layer an indication of whether or not the blank data is inserted, wherein
   said blank data is generated by referring to the length and location information of data, which is added to a header of a preceding or succeeding protocol unit.

4. The method of claim 1, wherein in (b), when data in the first protocol unit of the plurality of protocol units is lost, not transmitting all of the protocol units to the upper layer.

5. The method of claim 2, wherein in (b), when data in the first protocol unit of the plurality of protocol units is lost, not transmitting all of the protocol units to the upper layer.

6. The method of claim 3, wherein in (b), when data in the first protocol unit of the plurality of protocol units is lost, not transmitting all of the protocol units to the upper layer.

7. The method of claim 1, wherein in (b), when data in a last divided protocol unit is lost, blank data of a length equal to a length of a preceding divided protocol unit is inserted, and then the data and information on the changed length is transmitted.

8. The method of claim 2, wherein in (b), when data in a last divided protocol unit is lost, blank data of a length equal to a length of a preceding divided protocol unit is inserted, and then the data and information on the changed length is transmitted.

9. The method of claim 3, wherein in (b), when data in a last divided protocol unit is lost, blank data of a length equal to a length of a preceding divided protocol unit is inserted, and then the data and information on the changed length is transmitted.

10. The method of claim 1, wherein in (b), when the loss of data from the protocol units is determined, determining whether or not to transmit the data according to a characteristic of an application layer.

11. The method of claim 2, wherein in (b), when the loss of data from the protocol units is determined, determining whether or not to transmit the data according to a characteristic of an application layer.

12. The method of claim 3, wherein in (b), when the loss of data from the protocol units is determined, determining whether or not to transmit the data according to a characteristic of an application layer.

13. The method of claim 1, wherein the protocol is a radio link protocol (RLP).

14. The method of claim 2, wherein the protocol is a radio link protocol (RLP).

15. The method of claim 3, wherein the protocol is a radio link protocol (RLP).

16. The method of claim 4, wherein the protocol is a radio link protocol (RLP).

17. The method of claim 5, wherein the protocol is a radio link protocol (RLP).

18. The method of claim 6 wherein the protocol is a radio link protocol (RLP).

19. The method of claim 7, wherein the protocol is a radio link protocol (RLP).

20. The method of claim 8, wherein the protocol is a radio link protocol (RLP).

21. The method of claim 9, wherein the protocol is a radio link protocol (RLP).

22. An apparatus for transmitting or receiving wireless data, comprising:
   a transmitting means for dividing a collection of data in an application layer into a plurality of protocol units, adding length information and location information of the data to a header of each unit and transmitting the protocol units; and
   a receiving means for determining whether or not data included in the protocol units is lost, by referring to the length and location information of the data added to the header of each of the predetermined protocol units received from the transmitting means, re-forming the collection of data by inserting blank data into any part from which data is lost and signaling to an upper layer an indication of whether or not the blank data is inserted.

23. The apparatus of claim 22, wherein the plurality of protocol units is supported by a lower layer.

24. The apparatus of claim 22, wherein the transmitting means comprises:
   a data determining unit for comparing a length of the collection of data in the application layer with a size of a payload; and
   a format processing unit for dividing the collection of data into a plurality of protocol units when the length of the application layer is longer than the length of the payload, and adding the length information and location information of the divided data to the header of each protocol unit.

25. The apparatus of claim 24, wherein the payload is of a format supported by a lower layer.

26. The apparatus of claim 22, wherein the receiving means comprises:
   a packet extracting unit for extracting header information and payload from each protocol unit while transmitting data received from the transmitting means to the upper layer; and
   a data processing unit for determining whether or not data included in the protocol units is lost, by referring to information on the length and location of data added to the header, and re-forming the whole collection of data by inserting blank data into any part from which data is determined to be lost.

27. The apparatus of claim 26, wherein the data added to the header is extracted by the packet extracting unit.

28. A wireless data communication method comprising:
   (a) when a length of a collection of data in an application layer is longer than a length of a payload of a protocol, dividing the collection of data into a plurality of protocol units, and transmitting the protocol units of data after adding length information and location information of the data divided into the protocol units; and
   (b) receiving the protocol units which are transmitted, determining whether or not a loss of data has occurred in the received protocol units, by referring to the length and location information of data divided into the protocol units in (a), above, and if it determined that data in a last divided protocol unit is lost such that a length of the last divided protocol unit is unknown, inserting blank data of a length equal to a length of a preceding divided protocol data into a part corresponding to the lost data to re-form the entire collection of data, and then the data and information on the changed length is transmitted.

29. A wireless data receiving method wherein application data is divided into a plurality of predetermined protocol units, and a bit stream, in which length information and location information of data divided into the protocol units is added, is received, the wireless data receiving method comprising:
   (a) receiving the predetermined protocol units in a predetermined sequence, and checking whether or not data is lost, by referring to the information on the length and location of data added to each of the predetermined protocol units; and
   (b) determining whether or not a loss of data has occurred in the received protocol units, by referring to the length and location information of data in said bit stream, and if it determined that data in a last divided protocol unit is lost such that a length of the last divided protocol unit is unknown, inserting blank data of a length equal to a length of a preceding divided protocol data into a part corresponding to the lost data to re-form the entire collection of data, and then the data and information on the changed length is transmitted.

* * * * *